United States Patent
Grinberg

(10) Patent No.: US 8,312,102 B2
(45) Date of Patent: Nov. 13, 2012

(54) TECHNIQUES FOR PREVIEWING CONTENT PACKAGE FILES THROUGH A PORTAL

(75) Inventor: Oded Grinberg, Haifa (IL)

(73) Assignee: SAP AG, Walldorf (DE)

( * ) Notice: Subject to any disclaimer, the term of this patent is extended or adjusted under 35 U.S.C. 154(b) by 1838 days.

(21) Appl. No.: 10/734,550

(22) Filed: Dec. 11, 2003

(65) Prior Publication Data

US 2005/0102373 A1 May 12, 2005

Related U.S. Application Data

(60) Provisional application No. 60/519,007, filed on Nov. 10, 2003.

(51) Int. Cl.
 *G06F 15/16* (2006.01)
(52) U.S. Cl. .......................... 709/217; 709/238; 709/246
(58) Field of Classification Search .................. 709/217, 709/218, 219, 238, 246; 707/204
See application file for complete search history.

(56) References Cited

U.S. PATENT DOCUMENTS

| 6,160,544 A * | 12/2000 | Hayashi et al. ............... 715/716 |
| 6,160,554 A * | 12/2000 | Krause .......................... 715/804 |
| 6,722,338 B2 * | 4/2004 | Okano et al. ............. 123/198 E |
| 6,771,384 B1 * | 8/2004 | Laverty et al. ............... 358/1.15 |
| 6,772,338 B1 * | 8/2004 | Hull .............................. 713/168 |
| 6,879,988 B2 * | 4/2005 | Basin et al. ............................ 1/1 |
| 2002/0120639 A1 * | 8/2002 | Basin et al. .................... 707/204 |
| 2003/0140065 A1 * | 7/2003 | Lovvik et al. ................. 707/200 |

OTHER PUBLICATIONS

Heede, B. "How to Download Business Packages from iViewStudio". 2002, pp. 1-25, http://www.2.Iviewstudio.com/portal/main/sub_content/docs/Download_procedure_for_Business_packages_from_iViewStudio_In_ScreenShots.pdf.
"SAP Portals Enterprise Portal" 2002, pp. 1-8, http://h71028.ww7.hp.com/enterprise/downloads/50053164.pdf.
Wikipedia: "Metadata" http://en.wikipedia.org/w/index.php?title=Metadata&oldid=1974377 downloaded on Aug. 9, 2006.

* cited by examiner

*Primary Examiner* — Dhairya A Patel
(74) *Attorney, Agent, or Firm* — Buckley, Maschoff & Talwalkar LLC

(57) ABSTRACT

Techniques for previewing a content package file through a portal interface before the file is imported to the portal server computer are provided. A content package file is a relational data structure that contains references to a first level of content files. The first level content files within the content package file can contain references to second level content files, the second level content files can contain references to third level content files, etc. The references to the content files are replaced with content from the content files. Information about the content files is displayed in a preview format through a portal interface before the content files are imported. The user can be notified if any of the references to content files contain errors.

28 Claims, 3 Drawing Sheets

TECHNIQUES FOR PREVIEWING CONTENT PACKAGE FILES THROUGH A PORTAL

CROSS-REFERENCES TO RELATED APPLICATIONS

This application claims the benefit of U.S. Provisional Application No. 60/519,007, filed Nov. 10, 2003, which is incorporated by reference herein.

BACKGROUND OF THE INVENTION

The present invention relates to techniques for previewing content package files through a portal, and more particularly, to techniques for previewing content package files through a portal interface before importing the content package files into the portal.

A content package file is a relational data structure file that contains references to other content files. The other content files reside in the same directory as the content package file or in subdirectories of the package content file directory. A content package file may be written in an Extensible Markup Language (XML), for example.

Client-server systems can import content package files to a portal server computer. When a content package file is imported, all of the content files referenced in the content package file are also imported to the portal server computer. The user can view the content package file using a portal.

When a content package file is imported, all of the other content files referred to in the content package file are also imported and stored on the portal server computer. One or more of the referenced content files may be duplicative of a content file currently stored on the portal server computer.

When the referenced content files are imported and "update" mode is used, these referenced content files automatically overwrite any content files previously stored on the portal server computer that have the same names. If the user has, in the interim, updated or otherwise edited content files stored on the portal server computer, those updates and edits are lost if a content file with the same name is imported. This creates a problem, because users have no reliable way of knowing which other content files are referenced in the package content file, until after the package content file and the files it references are imported, and previously updated files with the same name have been erased.

Other problems occur when content package files are imported to a portal server computer. As discussed above, content package files contain references to other content files in the form of path names. These path names in the content package file may contain errors. For example, the path name may be misspelled. In this case, the misspelled path name does not refer to a valid path. As another example, a path name in the content package file may not refer to path where a content file is actually stored. This type of error can occur if a content file is moved from one location to another.

When a user imports a content package file that contains an incorrect path name, the content file referenced by the incorrect path name is not imported to the portal server computer. Instead, the user must locate and then import this content file separately.

It would therefore be desirable to provide techniques for importing content package files through a portal that eliminate these problems.

BRIEF SUMMARY OF THE INVENTION

The present invention provides techniques for previewing a content package file through a portal interface before the file is imported to the portal server computer. When a user requests to preview a content package file, the present invention analyzes the content package file and extracts basic information from the content package file.

The content package file contains references to a first level of other content files. The first level content files within the content package file can contain references to second level content files. The second level content files can contain references to third level content files, and so on.

The content from the content package file and the other contents files can be packaged into one large file. Basic information is extracted from this large file that summarizes the content files and their relationships to each other and the content package file. The basic information is then displayed in a preview screen to the user through a portal interface before the content files are imported.

A user can be notified if any of the references to content files contain errors. This feature allows a user to correct an erroneous reference before the content files are imported onto the portal server computer.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
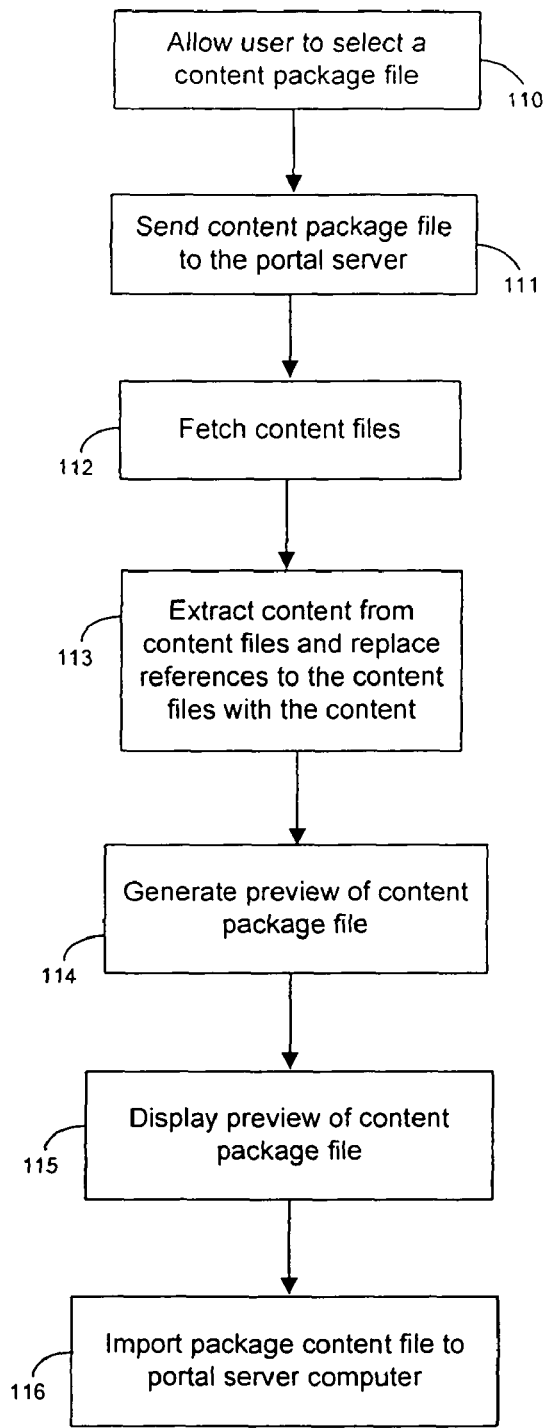
FIG. 1 illustrates a process for allowing a user to preview a content package file and the content files referred to within the content package file according to an embodiment of the present invention.

The present invention allows a user to preview a content package file through a portal before the file is imported to a portal server. FIG. 1 is a flow chart that illustrates a process according to an embodiment of the present invention.

Figure 2:
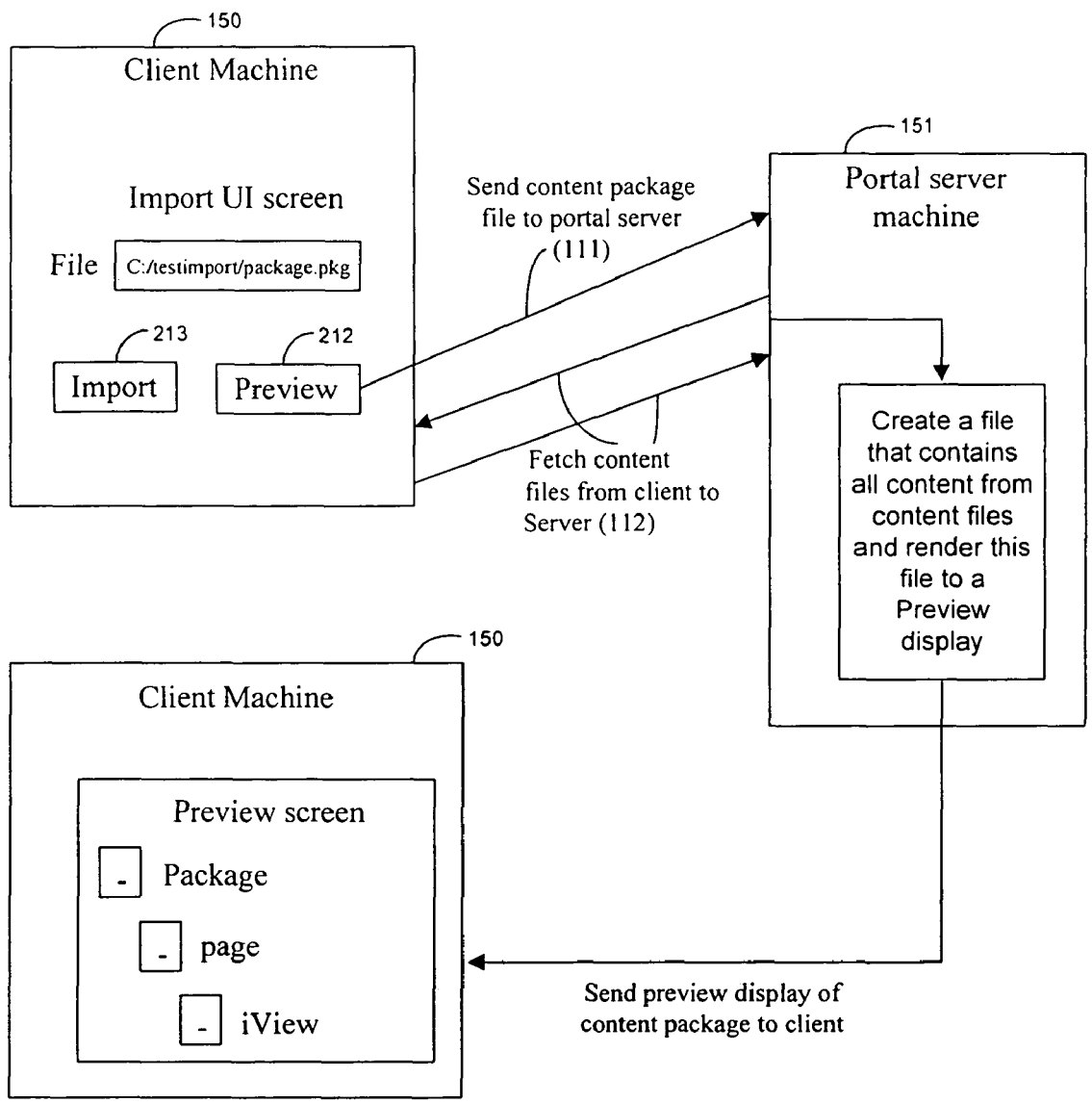
FIG. 2 illustrates a client-server system diagram that implement an embodiment of the present invention.

FIG. 2 illustrates an example of a client-server system diagram that can implement an embodiment of the present invention. The system diagram of FIG. 2 includes a client machine 150 and a portal server machine 151. The process described in FIG. 1 can be implemented by the client-server system shown in FIG. 2.

Figure 3:
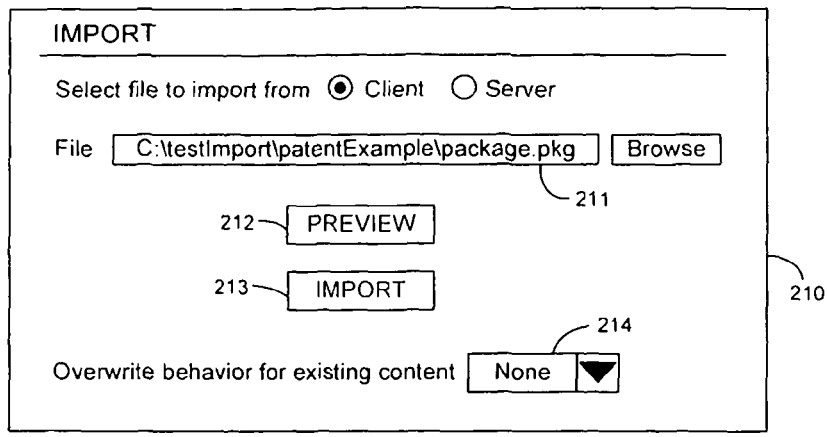
FIG. 3 illustrates an example of a display screen that allows a user to select a content package file to preview according to the present invention.

Referring to FIG. 1, initially, a user is allowed to select a content package file at step 110. FIG. 3 illustrates an example of a display screen 210 that can be provided to a user to allow the user to select a content package file at step 110. A user can type the path to a content package file directly in region 211 or browse through directories of files to locate the path to a content package file.

Screen 210 allows a user to choose whether to import a file from a client or a server machine. The user can import a content package file from a server machine or from a client machine.

A user can select preview option 212 in screen 210 to preview the content package file specified in region 211 according to the principles of the present invention. A user can select import option 213 to import the content package file specified in region 211.

When a user selects preview option 212, the content package file specified in region 211 is sent to server 151 at step 111 as shown in FIGS. 1 and 2. Server 151 extracts the references to the content files referred to within the content package file. Server 151 then fetches the content files at step 112.

Content files referred to in the content package file are called first level content files. Content files referred to in a first level content file are called second level content files. Content files referred to in a second level content file are called third level content file, etc.

Portal server 151 iterates through each of the content files, extracts from them the references to other content files (i.e., the second level, third level, etc. content files), and then fetches these other content files from client 150 at step 112. This iterative process stops when all of the references to content files have been extracted and fetched.

The portal server 151 establishes communications with client 150 to transfer the content files to portal server 151 at step 112. These communications are depicted in FIG. 2. In an alternative embodiment of the present invention, the content files are transferred to portal server 151 from another server machine.

At step 113, the contents of the content files fetched at step 112 are extracted. All of the content from the content file is extracted including all of its data and code. Also at step 113, all of the references to the content files are replaced with the extracted content. A large combined file (e.g., a large XML file) is created at step 113. In this combined file, all of the references are eliminated from the content package file and the content files.

At step 114, a preview screen of the content package file is created using the combined file generated at step 113. The portal server renders basic information about the content files from the combined file to create the preview screen. Portal server 151 then sends this preview display to client machine 150.

In general, at step 114, the basic information rendered about the content files is less than all of the content in the content files. For example, the basic information about the content files can include meta-data such as names of the files, file types, version numbers, etc. The basic information can also include brief summaries of the content files.

The preview can be an HTML file format, or any other suitable file format used for displaying information. In one embodiment of the present invention, portal server 151 renders an XML combined file to create a preview HTML display.

After the server creates the preview screen at step 114, server 151 sends the preview screen to client 150 to be displayed on the client machine. At step 115, the preview screen of the content package file is displayed. The preview can display the basic information about the content files and the content package file. In one embodiment of the present invention, the preview screen displays an expandable hierarchy of the content package file and the referenced content files.

Steps 112-114 are typically performed on portal server 151. Portal server 151 establishes a communication with a client machine to fetch each of the content files. This technique requires the portal server to establish multiple communications with the client to obtain the content files.

To reduce the number of communications a portal server makes with the client, a user can compress the content package file and its referenced content files into a compressed file format, such as, for example, a Zip file. According to this embodiment, the portal server gets the compressed file. The server can then expand the file contents and generate the preview of the content package file. By compressing the content package file, the number of communications that the server has to make to fetch each of the content files is reduced. Therefore, the portal server can create the preview screen in less time.

Figure 4A:
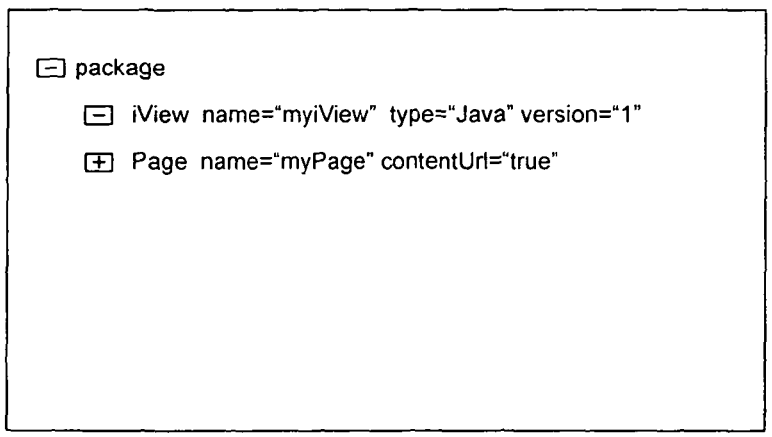
FIGS. 4A-4B illustrate examples of how a content package file and its sub-files can be previewed on a displayed screen in an expandable hierarchical format according to the present invention.
Figure 4B:
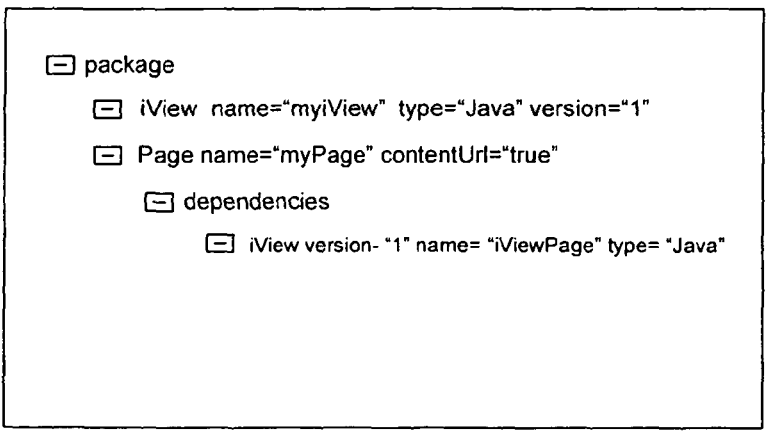

FIGS. 4A-4B are examples of preview screens that preview a content package file according to the present invention. The preview screens shown in FIGS. 4A-4B display a preview of a content package file in an expandable hierarchy.

According to this example, a user can click on the + (plus) or − (minus) icon next to the package to preview first level content files that are referred to in the content package file. A plus icon indicates that a content file contains references to other content files. A user can click on the plus icon to expand the next level of the hierarchy in order to view the referenced content files. When a minus icon is displayed next to a file in the preview screen, either there are no lower level content files referenced in that content file or the lower level content files are already displayed. It should be clear from this description that other icons may be used to indicate this information.

In the example of FIGS. 4A-4B, the preview screen displays a file name, a file type, and a version number for the content file named "myiView." For the content file name "myPage," the preview displays a file name and a Boolean value (contentUrl) indicating whether the myPage file refers to other content files. First level content file labels for myiView and myPage are displayed beneath the package content file name in an hierarchical format that is expandable. The user can click on the minus icon next to "package" to hide the first level content files as well as the other levels of content files.

The user can click on the plus icon next to content file name myPage in FIG. 4A to preview the second level content files that are referenced in the myPage file as shown in FIG. 4B. In this example, the myiView content file does not contain references to any other content files, and as a result, the myiView node cannot be expanded.

When the display for the content file myPage is expanded, the second level content files that are referenced in myPage are previewed beneath the listing of dependencies. For example, the content file iViewPage is referenced in the myPage file, so iViewPage is displayed in the dependencies list beneath the myPage file label in the hierarchical format.

If the iViewPage file contains references to other third level content files, then a plus icon is displayed next to the file label. By clicking on this plus icon, the iViewPage node can be expanded to preview the third level content files. In the example of FIG. 4B, the iView Page file does not contain any references to other content files, so a minus icon is displayed next to its label.

The present invention displays basic information next to each content file label in the preview screen. In the examples of FIGS. 4A-4B, file names, file types, and version numbers are displayed as part of the preview of the content files. In addition to this information, the preview can display a brief summary of the contents of one or more of the content files, or possibly some or all of the contents of the file.

According to the present invention, any data or code from the content files can be displayed in the preview screen through a portal. The purpose of the preview screen is to let the user know which content files are embedded in a file hierarchy beneath the main content package file. Additional basic information about the file such as a file type, name and a brief summary of its content can be displayed to help the user better understand the nature of each of the embedded content files.

Based on the information displayed about each content file in the preview screen, the user can decide whether to import the content package file. If the user decides to import the content package file, the user clicks on import option 213. The package content file and all of the lower level embedded content files are then imported to the portal server computer at step 116.

The present invention also allows a user to determine whether the content files imported to the portal server computer overwrite existing content files with the same name. Drop down list 214 in the display screen of FIG. 3 gives the user the option to select whether the imported content files overwrite existing content files. In FIG. 3, the user has chosen 'none' from the list, which prevents the imported content files from overwriting any of the existing content files stored on the portal server computer. This feature allows a user to prevent an imported content file from overwriting an existing file that has been updated or otherwise changed with respect to the imported file.

Because the present invention displays each of the lower level content files in the preview screen before the content files are imported, the user can see in the preview screen whether any of the content files may overwrite his existing files. If such overwrite files exist, then the user selects the 'none' option from list 214 to prevent his existing files from being lost.

If the user wants content files displayed in the preview screen to overwrite existing files, the user can select a different option from list 214. Drop down list 214 has an option that causes imported files to overwrite any existing files with the same name on the portal server computer.

As discussed above, one (or more) of the references to the content files may contain an error. There are two types of errors. One type of error occurs when the wrong path name is entered as the reference. Another type of error occurs when the correct path name is initially entered as the reference, but the content file is subsequently moved to another location.

In any event, when one of the content file references is erroneous, the system detects the error when it tries to fetch the content file at step 112. The preview screen then displays an error message to the user indicating that the reference to the file contains an error. The user can then fix the erroneous reference and then attempt to preview the content files again.

This feature is advantageous, because it allows the user to fix any errors in the content file references before the content package file is imported to the portal server computer. This provides the user with enhanced control over the content of the files that are imported onto to the portal server computer. Without this feature, content files linked to erroneous references are not imported to the portal server computer.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for generating a preview of a content package file, the method comprising:
    retrieving references to first level content files from the content package file, wherein the first level content files are separate files from the content package file;
    extracting content from the first level content files;
    replacing references to the first level content files in the content package file with the content extracted from the first level content files to create a combined file;
    removing the references from the combined file; and
    creating a preview of at least a portion of the content package file based on the content in the combined file, wherein information rendered by the preview displays at least some of the content extracted from the first level content files and content from the content package file, wherein the preview displays a version of the content package modified with the content from the combined file, wherein the preview occurs prior to generating a modified content package file from the combined file.

2. The method according to claim 1 wherein the preview of the content package file includes meta-data about the first level content files.

3. The method according to claim 1 further comprising:
    determining whether the first level content files contain references to second level content files.

4. The method according to claim 3 further comprising:
    if the first level content files contains references to second level content files, retrieving the second level content files;
    extracting content from the second level content files and replacing the references with content from the second level content files.

5. The method according to claim 4 wherein the preview of the content package file contains information about the first level and the second level content files in an hierarchical format.

6. The method according to claim 5 wherein the hierarchical format of the preview is expandable to view the information about the first level and the second level content files.

7. The method according to claim 1 further comprising:
    importing the content package file to a portal server computer.

8. The method according to claim 7 further comprising:
    storing the content package file and the first level content files on the portal server computer, wherein the first level content files overwrite duplicative files that are stored on the portal server computer.

9. The method according to claim 7 further comprising:
    storing the content package file and the first level content files on the portal server computer, wherein the first level content files do not overwrite duplicative files that are stored on the portal server computer.

10. The method according to claim 1 further comprising:
    displaying a notification if any of the references to any content files contain errors.

11. A computer program product for previewing a content package file comprising code stored on a non-transitory computer readable medium, the code comprising:
    code for fetching references to first level content files from the content package file, wherein the first level content files are separate files from the content package file,
    code for obtaining content from the first level content files;
    code for replacing references to the first level content files in the content package file with the content extracted from the first level content files to create a combined file;

code for removing the references from the combined file; and code for generating a preview of the content package file based on the content in the combined file, wherein information rendered by the preview displays at least some of the content extracted from the first level content files and content from the content package file, wherein the preview displays a version of the content package modified with the content from the combined file, wherein the preview occurs prior to generating a modified content package file from the combined file.

12. The computer program product of claim 11 further comprising:
code for displaying a notification if any of the references to the first level content files contain errors.

13. The computer program product of claim 11 further comprising:
code for determining whether any of the first level content files contain references to second level content files.

14. The computer program product of claim 13 further comprising:
code for fetching the second level content files referred to in the first level content files;
code for obtaining content from the second level content files;
code for replacing the references to the second level content files with the content from the second level content files to create the combined file.

15. The computer program product of claim 14 wherein the code for previewing the content package file displays the content from the first level and the second level content files in a hierarchical format.

16. The computer program product of claim 15 wherein the hierarchical format is expandable to view the content from the first level and the second level content files.

17. The computer program product of claim 11 further comprising:
code for importing the content package file to a portal server computer.

18. The computer program product of claim 11 further comprising:
code for storing the content package file and the first level content files on the portal server computer so that the first level content files do not overwrite duplicative files stored on the portal server computer.

19. A computer system that previews a content package file containing references to content files, the computer system comprising:
a portal server that fetches references to content files from the content package file, wherein the content files are separate files from the content package file, fetches the content files associated with the references, replaces the references to the content files with content extracted from the content files to create a combined file, removes the references from the combined file; and creates a preview screen of the content package file and the content files using the combined file; and a client that displays the preview screen, wherein information rendered by the preview screen displays at least some of the content extracted from the first level content files and content from the content package file, wherein the preview screen displays a version of the content package file modified with content from the combined file, wherein the preview screen displays the modified version of the content package file prior to the portal server importing the content package file and the content files from the client.

20. The computer system according to claim 19 wherein the preview screen displays a notification if any of the references contain errors.

21. The computer system according to claim 19 wherein the preview screen displays the content from the content files in a hierarchical format.

22. The computer system according to claim 19 wherein the portal server imports the content package file and the content files from the client if a user selects an import option after viewing the preview screen.

23. The computer system according to claim 19 wherein the content files include first level content files and second level content files.

24. The computer system according to claim 19 wherein the preview screen displays meta-data about the content files.

25. A method of previewing the generation of a content package file, the method comprising;
obtaining references to first level content files from a content package file, wherein the content files are separate filed from the content package file;
extracting content from first level content files referred to in a content package file;
extracting content from one or more lower level content files referenced to the first level content files;
replacing references to the first level content files and the one or more lower level content files with at least some of the extracted content to generate a combined content file representing a modified version of the content package file;
removing the references from the combined content file; and
previewing the modified version of the content package file to determine if there are issues associated with generating a modified content package file using the combined file content.

26. The method of claim 25, wherein the issues comprise errors associated with file location or file name.

27. The method of claim 25, wherein previewing the combined content file comprises identifying any of the first level content files or any of the one or more lower level content files that overwrite existing files to generate the modified content package file.

28. The method of claim 27, wherein identifying comprises providing an option for allowing or disallowing overwriting existing files with the first level content files or any of the one or more lower level content files.

* * * * *